(12) United States Patent  
Perkins

(10) Patent No.: US 8,531,314 B2  
(45) Date of Patent: Sep. 10, 2013

(54) ILLUMINATED AIRCRAFT WHEEL CHOCK INDICATOR

(76) Inventor: Kim Perkins, Douglasville, GA (US)

( * ) Notice: Subject to any disclaimer, the term of this patent is extended or adjusted under 35 U.S.C. 154(b) by 242 days.

(21) Appl. No.: 12/945,868

(22) Filed: Nov. 14, 2010

(65) Prior Publication Data

US 2012/0119925 A1   May 17, 2012

(51) Int. Cl.
   *G08B 21/00*   (2006.01)
(52) U.S. Cl.
   USPC ........... 340/960; 340/945; 340/686.1; 410/30
(58) Field of Classification Search
   USPC ................. 340/960, 436, 686.1, 686.2, 691.1, 340/691.6, 693.9, 693.11; 188/32; 414/401
   See application file for complete search history.

(56) References Cited

U.S. PATENT DOCUMENTS

| | | | | |
|---|---|---|---|---|
| 6,505,713 | B1 * | 1/2003 | Paul et al. | 188/36 |
| 7,032,720 | B2 * | 4/2006 | Jette et al. | 188/36 |
| 7,226,265 | B2 * | 6/2007 | Wilson | 414/401 |
| 8,286,757 | B2 * | 10/2012 | Nelson | 188/4 R |
| 2011/0290596 | A1 * | 12/2011 | Perkins | 188/32 |

* cited by examiner

*Primary Examiner* — Toan N Pham  
(74) *Attorney, Agent, or Firm* — Kenneth A. Roddy

(57) ABSTRACT

A visual display used to indicate when aircraft wheel chocks have been inserted against the aircraft tires and the tarmac. The display is mounted on the exterior of an aircraft terminal at an elevation that is easily viewable by an aircraft operator. The indicator system contains illuminated characters operated from an electrical switch. The electrical switch is located remotely from the display where it is accessible by personnel standing on the tarmac. The switch positions include "OUT" and "IN". When the switch is moved to the "IN" position, the arrow characters are illuminated. When the switch is moved to the "OUT" position, the arrow characters are not illuminated. This system provides a safe and efficient means for ground personnel to signal the aircraft operator that the wheel chocks are in place against the aircraft wheel assembly.

10 Claims, 13 Drawing Sheets

CHOCKS INDICATOR LIGHTS          REMOTE SWITCHBOX

CHOCKS INDICATOR LIGHTS    REMOTE SWITCHBOX

ILLUMINATED AIRCRAFT WHEEL CHOCK INDICATOR

BACKGROUND OF THE INVENTION

1. Field of the Invention

This invention relates to activities typically employed by ground located personnel when assisting with the parking of an aircraft at a passenger terminal. More specifically, this invention is utilized by a Ramp Agent to indicate to the aircraft operator that the aircraft wheel chocks are applied to the aircraft.

2. Description of the Related Art

Any discussion of the prior art throughout the specification should in no way be considered as an admission that such prior art is widely known or forms part of common general knowledge in the field.

Aircraft arriving at a terminal are typically guided to a parking position by an agent, sometimes referred to as a Ramp Agent. In some instances the Ramp Agent uses internationally recognized hand and arm signals to direct the aircraft operator to continue the approach to the terminal. When the aircraft reaches the desired stopping position, the Ramp Agent will indicate to the aircraft operator that the stop position is achieved. The aircraft operator will then apply and hold the brakes. The operator will continue to hold the brakes until the Ramp Agent signals that one or more wheel chocks have been inserted against the aircraft wheels and the tarmac. This "Chocks-In" signal is typically a hand signal comprised of two clenched fists with the thumbs of each fist extended and pointing toward each other. In low light conditions and at night, the Agent may utilize an illuminated wand in each hand to improve the visibility of the hand signal. When using the wands, the Agent will orient them in a position pointing toward each other, similar to the thumb positions used when illumination is not needed. Hand signaling by such methods can be challenging. The close proximity of the aircraft to the terminal and the elevation of the cockpit make it difficult for the aircraft operator to view the Ramp Agent through the aircraft windows. The Agent may elect to stand on a ladder or on top of parked equipment to become more viewable. In some instances, airport terminal operators have employed a remotely operated display panel as referenced in U.S. Pat. No. 4,464,648 to guide the aircraft to a stopping position. The referenced display panel is commonly referred to as a "traffic light" and is mounted on an exterior surface of the terminal wall where it is easily viewable by the aircraft operator. This traffic light aids in indicating when the stopping location has been reached, but it does not contain a means to indicate when the wheel chocks have been inserted. A Ramp Agent utilizing the remotely operated traffic light is required to finish the parking sequence by using the aforementioned hand signaling methods to indicate when the wheel chocks are in place. Therefore, using and viewing hand signaling methods to complete a parking sequence remains as a challenge.

BRIEF SUMMARY OF THE INVENTION

The illuminated aircraft Wheel Chock Indicator of the present invention solves the problems associated with prior art. The indicator system is mounted in a location that is easily viewable by the aircraft operator and remotely activated by the Ramp Agent. Preferred mounting locations include the terminal building exterior, the passenger boarding bridge exterior, or a freestanding structure on the tarmac. It can be affixed to, or located in the close proximity of, the above described traffic light and operated in conjunction with it. When activated by the Ramp Agent, the Wheel Chock Indicator system provides a clear signal that the aircraft operator may use to determine that it is safe to release the aircraft brakes.

DETAILED DESCRIPTION OF THE INVENTION

Figure 1:
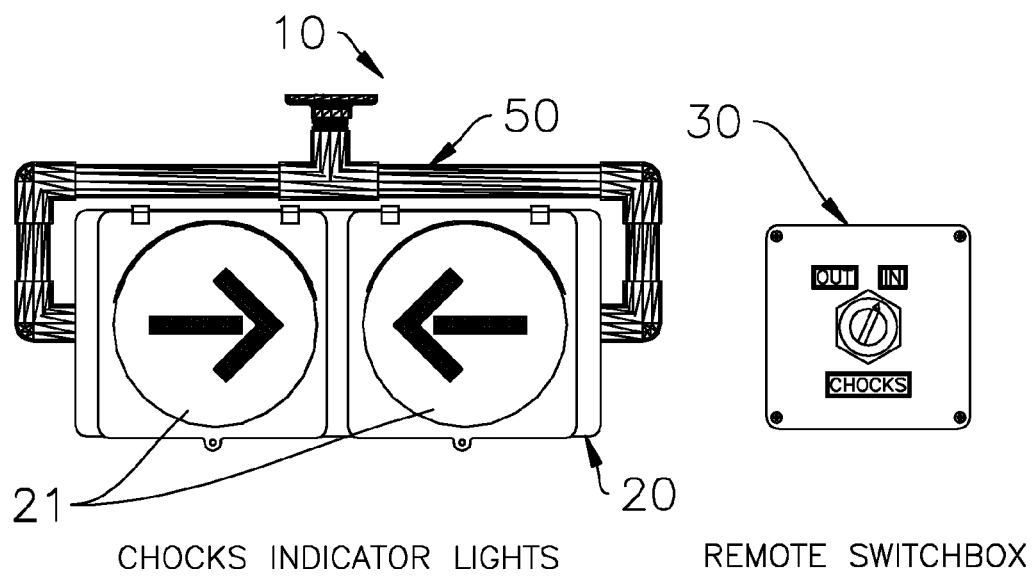
FIG. 1 is a front view of the three main assemblies utilized in the Wheel Chock Indicator system.

Overview: FIG. 1 depicts the three main assemblies of the preferred embodiment of the Wheel Cocks Indicator system. They are the chocks indicator light assembly 20, the piping and support assembly 50, and a remotely located switch assembly 30. The chocks indicator light assembly is constructed from traffic signal light modules containing back-lighted lenses with the light emitting portion configured in an arrow shape 21, or may be composed of light emitting diode (L.E.D.) arrays configured in an arrow shape. The piping and support assembly is constructed from 1½ inch ABS plastic pipe fittings and three Chase nipples. The remote switch assembly 30 is composed of a weather resistant electrical junction box with a single pole single throw selector switch mounted in the box cover.

Figure 2:
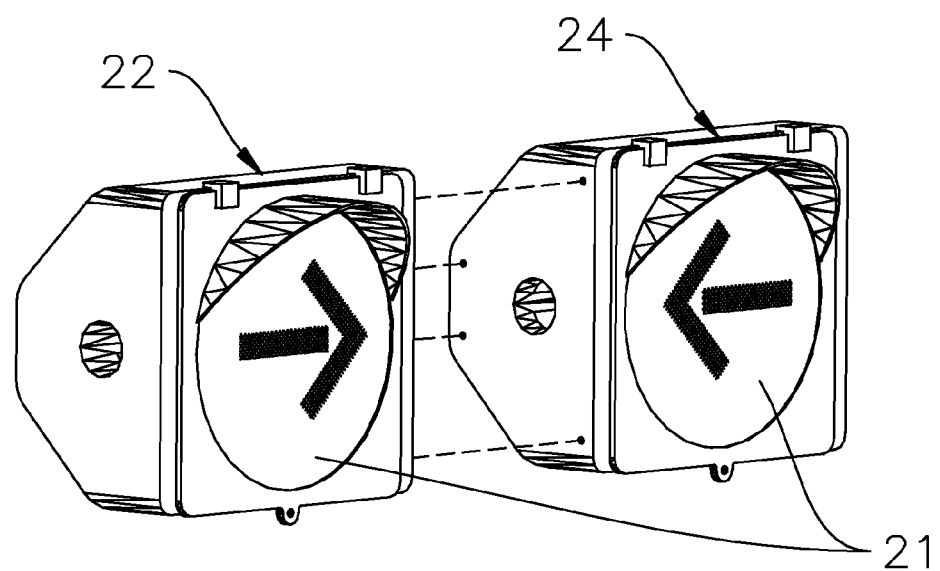
FIG. 2 is an isometric view of the two signal light modules that compose the Wheel Chock Indicator assembly.

Chocks Indicator Light Assembly: FIG. 2 depicts the two traffic signal modules 22 and 24 that are utilized to form the assembly 20. The modules are oriented in a side-by-side fashion and fastened end to end with common fasteners. The lenses or L.E.D. arrays 21 are oriented in a horizontal manner such that the arrow points are in close proximity to each other (opposing each other).

Figure 3:
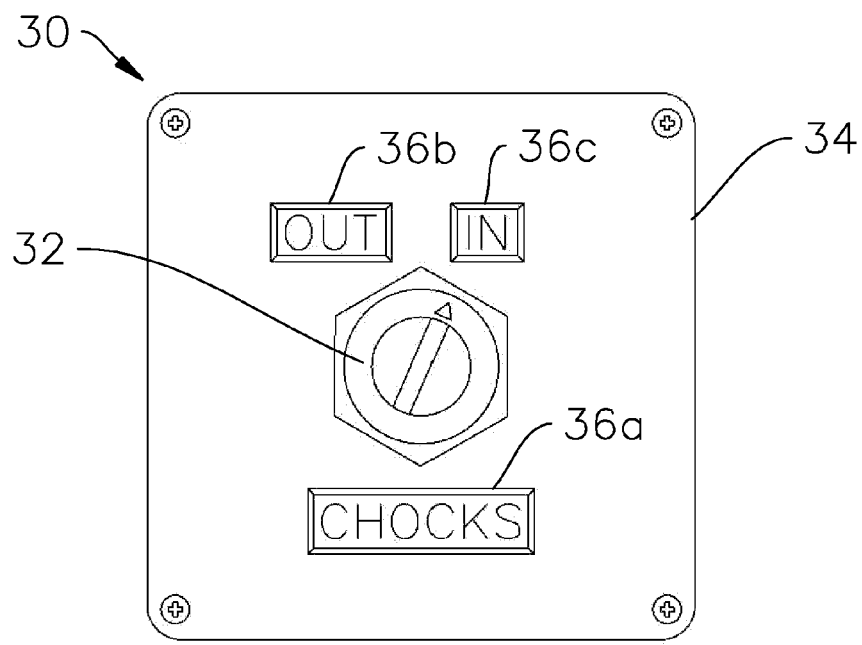
FIG. 3 is a front view of the wiring junction box containing the selector switch.

Remote Switch Assembly: FIG. 3 depicts the components of the remote switch assembly 30. A single pole single throw selector switch 32 is installed in the cover of a weather resistant electrical junction box 34. Labels are applied to the cover to identify the switch's function "CHOCKS" 36*a*, the inactive switch position "OUT" 36*b*, and the active switch position "IN" 36*c*.

Figure 4:
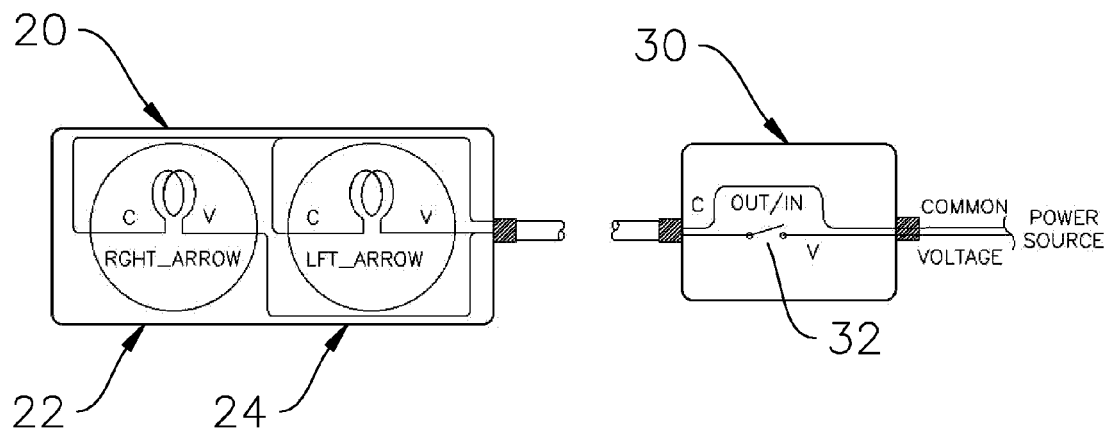
FIG. 4 is a basic wiring diagram of the Wheel Chock Indicator assembly and the selector switch.

System Wiring: FIG. 4 depicts the typical system wiring. An electrical power source is connected to the selector switch 32 inside junction box 30. The wiring for switched side of the power and the common side are subsequently routed from the junction box to the indicator assembly 20 via electrical cabling and conduit that is installed between the assemblies after mounting them in their respective locations. The wires are terminated inside the light assembly 20 to the electrical poles on each of the individual signal modules 22 and 24.

Figure 5:
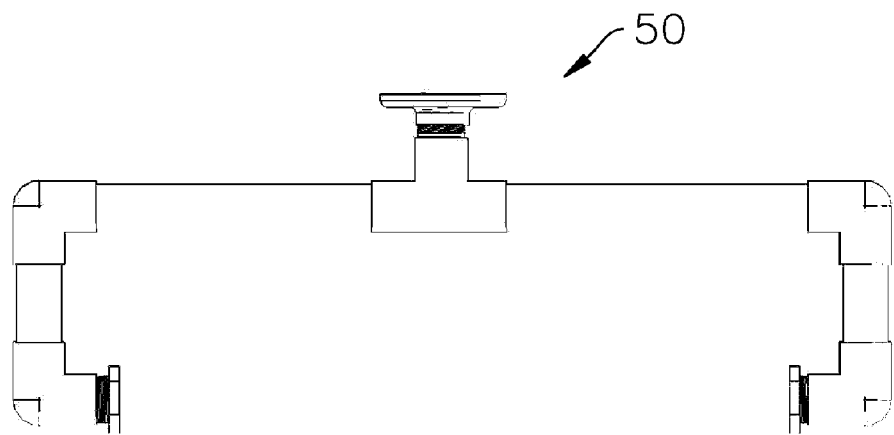
FIG. 5 is a top view of the piping and support assembly.
Figure 5A:
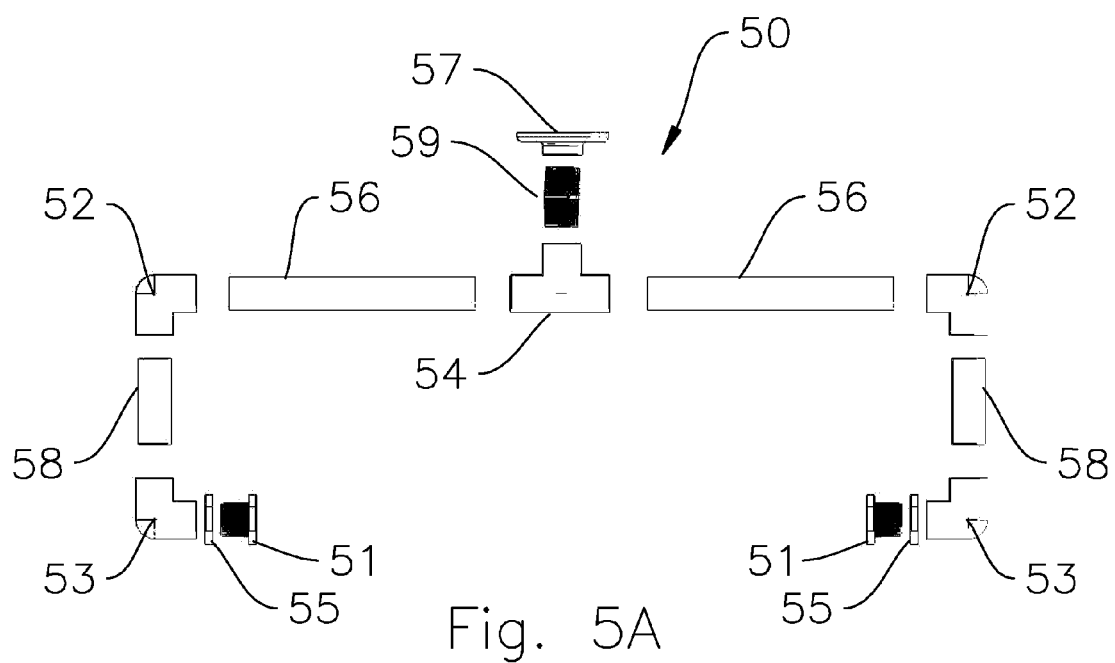
FIG. 5A is an exploded top view of the piping and support assembly.

Piping and Support Assembly: FIG. 5 is a top view of the electrical conduit and support piping assembly 50. The piping assembly is constructed from 1½ inch ABS plastic piping components and metal pipe fittings. The individual components are depicted in the exploded view of the assembly FIG. 5A and include: a metal 1½ inch female pipe flange 57; a metal 1½ inch pipe nipple 59; a pipe tee 54 that has two solvent connection ports and a female threaded port; two sections of 1½ inch ABS pipe 56; two 90 degree solvent connected elbows 52; two short sections of 1½ inch ABS pipe 58; two 90 degree elbows with one female threaded port each 53; and two metal Chase nipples with lock rings 51 and 55.

Figure 6:
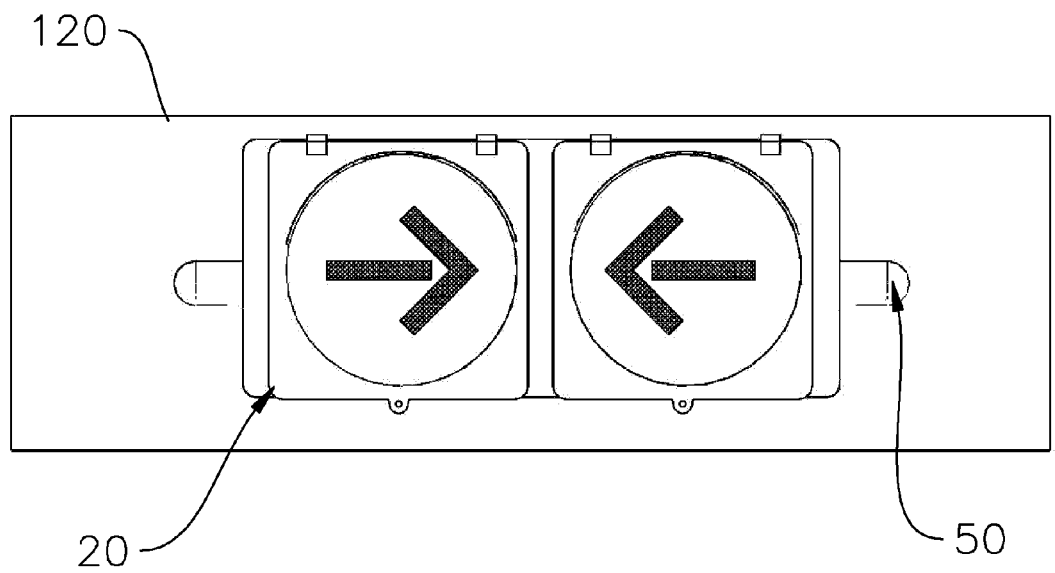
FIG. 6 is a front view of the Wheel Chock Indicator assembly mounted to a support panel.
Figure 6A:
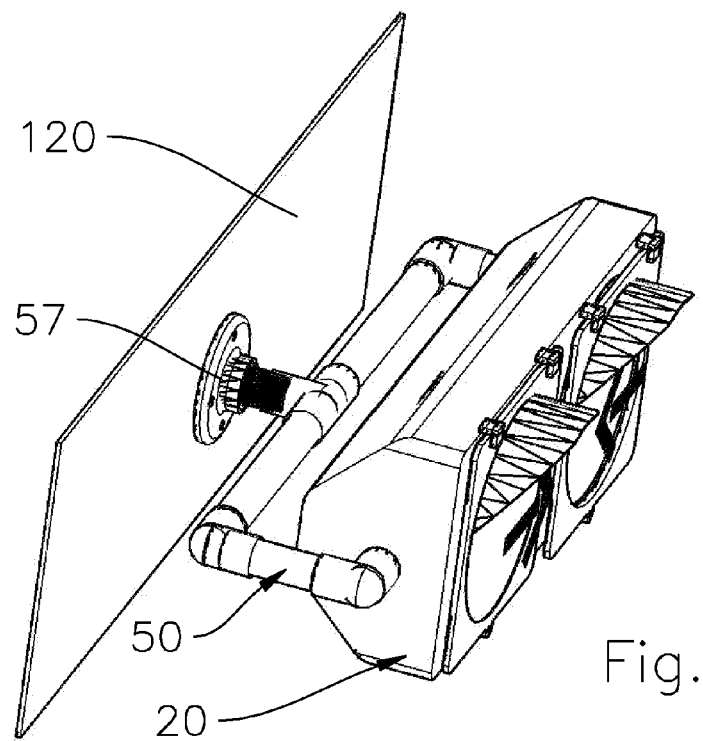
FIG. 6A is a right side isometric view of the Wheel Chock Indicator assembly mounted to a support panel for use as a stand-alone system.

Method of Manufacture: The fittings in the piping and support assembly that are designed for solvent connection are assembled with a solvent glue designed for ABS plastic. Threaded pipe fittings are screwed together without adhesive. The indicator light assembly 20 is inserted between the elbows 53 of the assembled piping system 50. The Chase nipples with lock rings 51 and 55 are inserted from the inside of the indicator assembly 20 through holes normally provided for electrical plumbing and screwed into the elbows. The entire assembly can then be attached to a metal support panel 120 using common fasteners though the pipe flange 57 as shown in FIG. 6 and FIG. 6A. A hole concentric with the pipe flange is drilled in the metal support panel to allow the electrical cabling to pass through. The indicator light assembly is ready for installation on the terminal wall. The completed assemblies would appear is in the front view FIG. 6 and in the isometric view FIG. 6A. This configuration is typical for a stand-alone indicator system.

Figure 7:
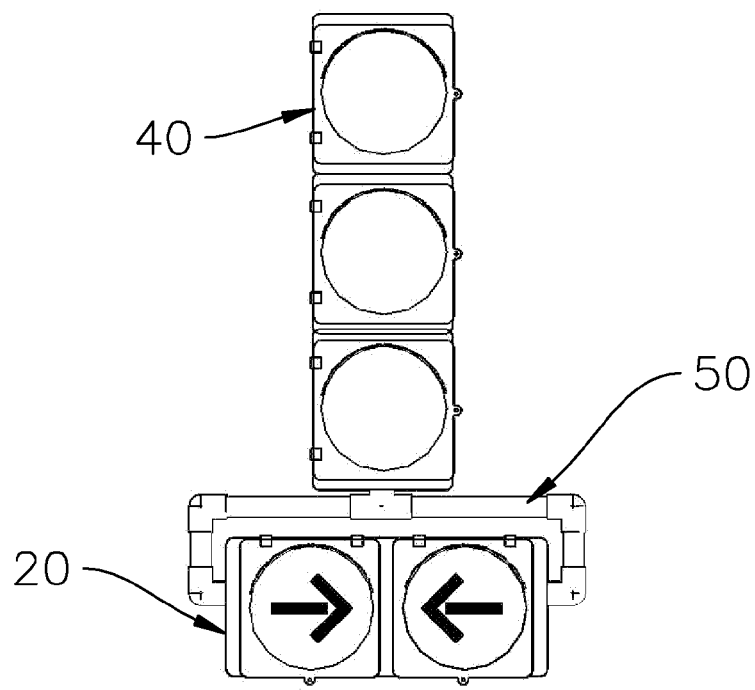
FIG. 7 is a front view of the preferred embodiment of the invention, depicting the Wheel Chock Indicator assembly with the piping and support assembly rotated to a vertical orientation and attached to a traffic light signal assembly.
Figure 7A:
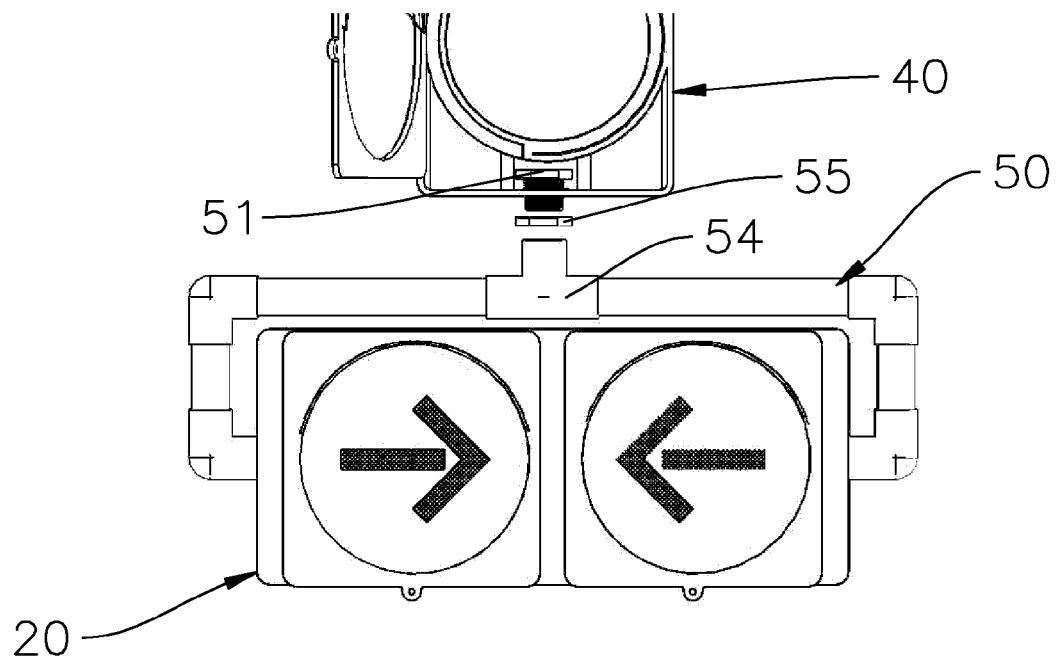
FIG. 7A is a close-up front view of the Wheel Chock Indicator assembly depicting the method of attachment to a traffic light signal assembly.

In the preferred embodiment the indicator system is used in conjunction with, and attached to, a traffic signal light as indicated in FIG. 7. To accomplish this, the indicator light assembly 20 and piping system 50 are assembled as previously described. The metal support plate 120, pipe nipple 59, and pipe flange 57, are not used. The entire piping assembly 50 is rotated to a vertical position such that the tee 54 is above the indicator light assembly 20, as shown in the close-up view FIG. 7A. An additional Chase nipple 51 and lock ring 55 are inserted through a hole in the bottom of the traffic signal light 40 and screwed into the tee 54.

Figure 8:
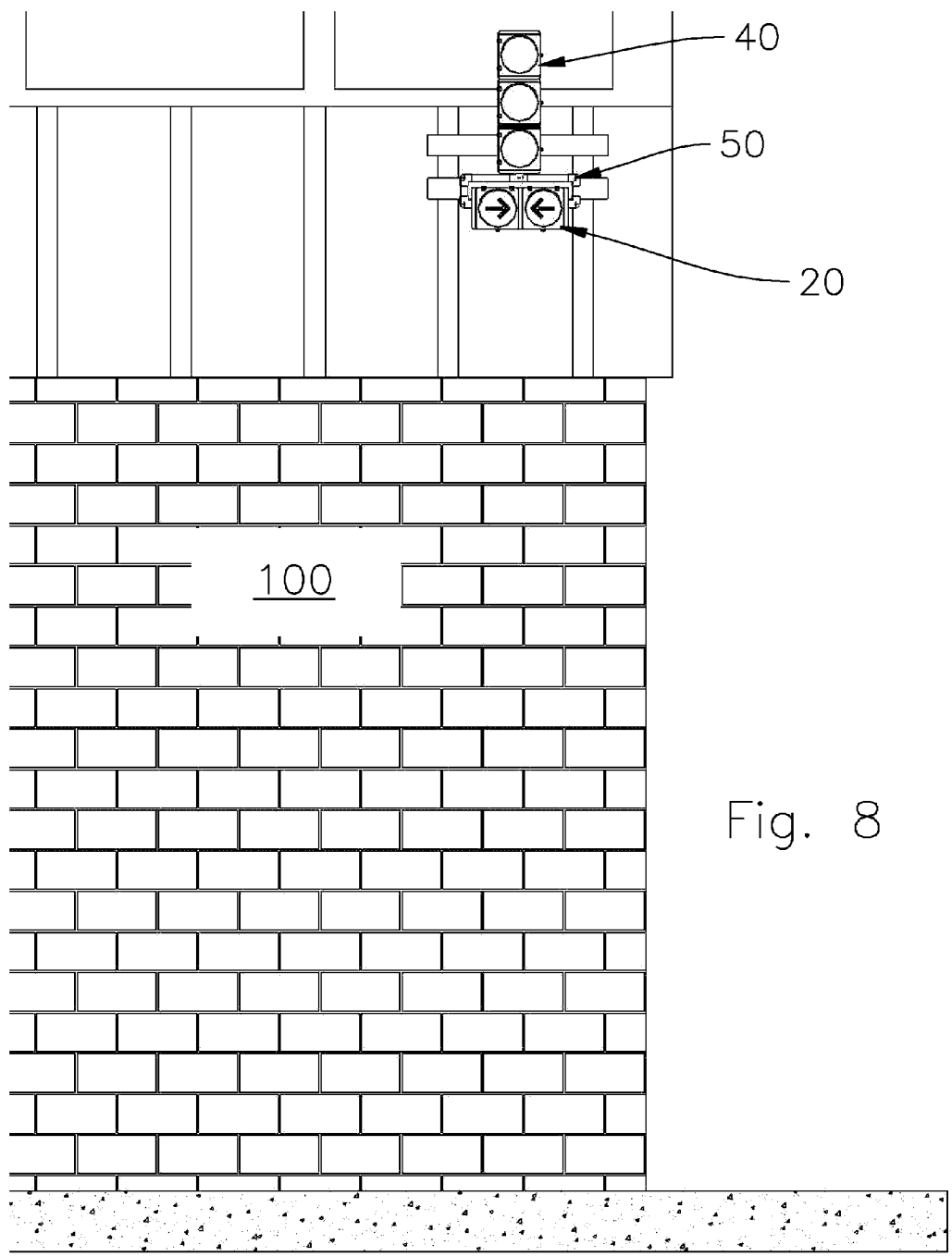
FIG. 8 is a view of the traffic light signal assembly and Wheel Chocks Indicator assembly as they would appear when mounted on an airport terminal exterior wall.

FIG. 8 depicts the assembled units 20, 50, and 40 as they would appear when installed on an airport terminal wall 100. The installation can be accomplished using a number of mounting methods appropriate for the wall construction. The final elevation of the lighted assemblies should be such that they are easily viewable from the aircraft cockpit and is dependent on the type of aircraft that utilize the parking location.

Figure 9:
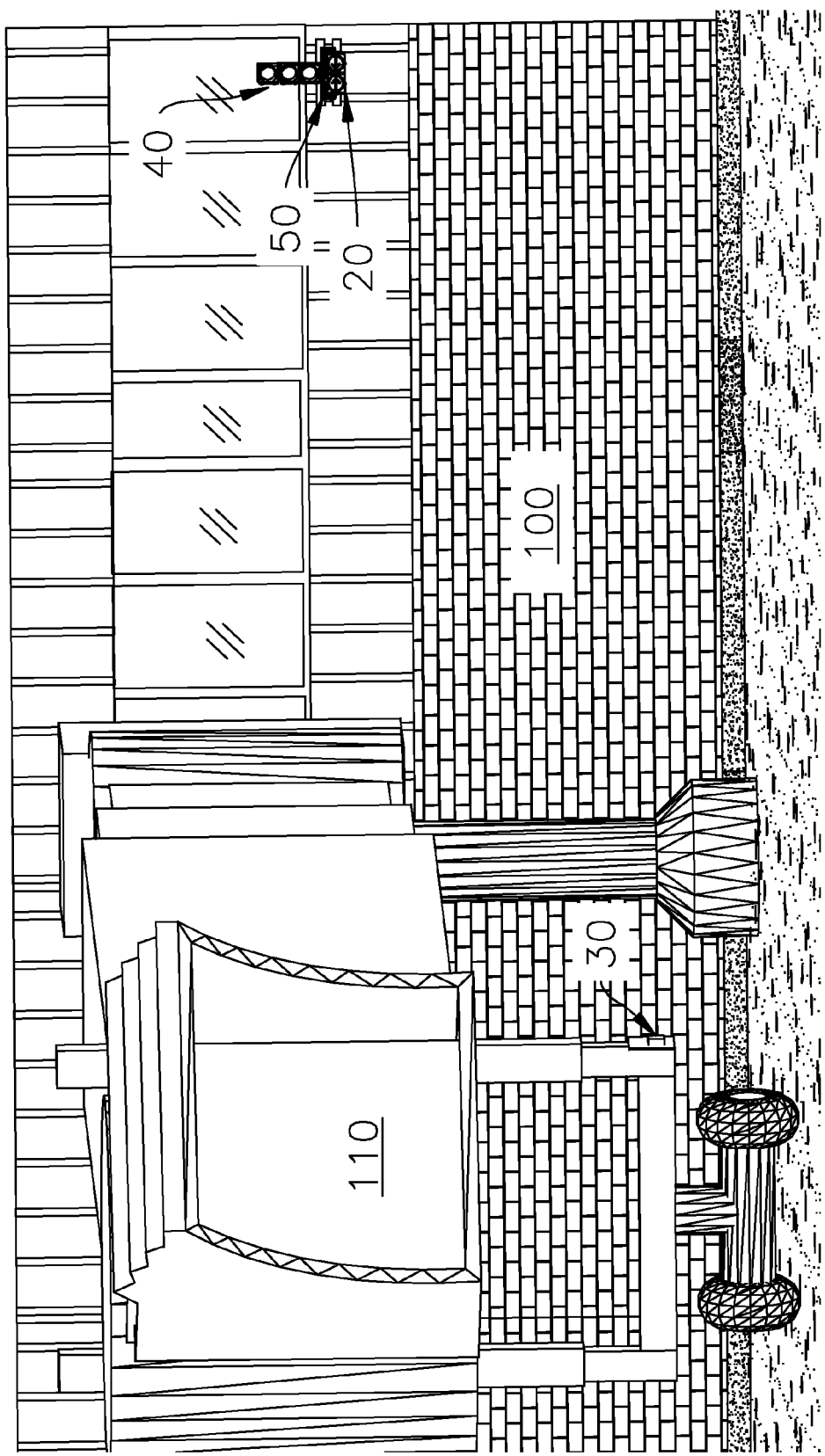
FIG. 9 is a view from a distance of the Wheel Chocks Indicator assembly and the remote switch assembly depicting the typical relationship to the aircraft parking area, the airport terminal, the airport tarmac, and the passenger boarding bridge.

FIG. 9 depicts a typical aircraft parking location with the Wheel Chocks Indicator system installed. The remote switch assembly 30 is installed on the passenger boarding bridge 110 in a location that is easily accessible from the tarmac, such as the bridge wheel bogie. The indicator light assembly 20 and traffic signal assembly 40 are installed on the terminal wall 100. Electrical cabling and conduit connecting the assemblies is routed through the boarding bridge cabling system and along the terminal wall.

Figure 10:
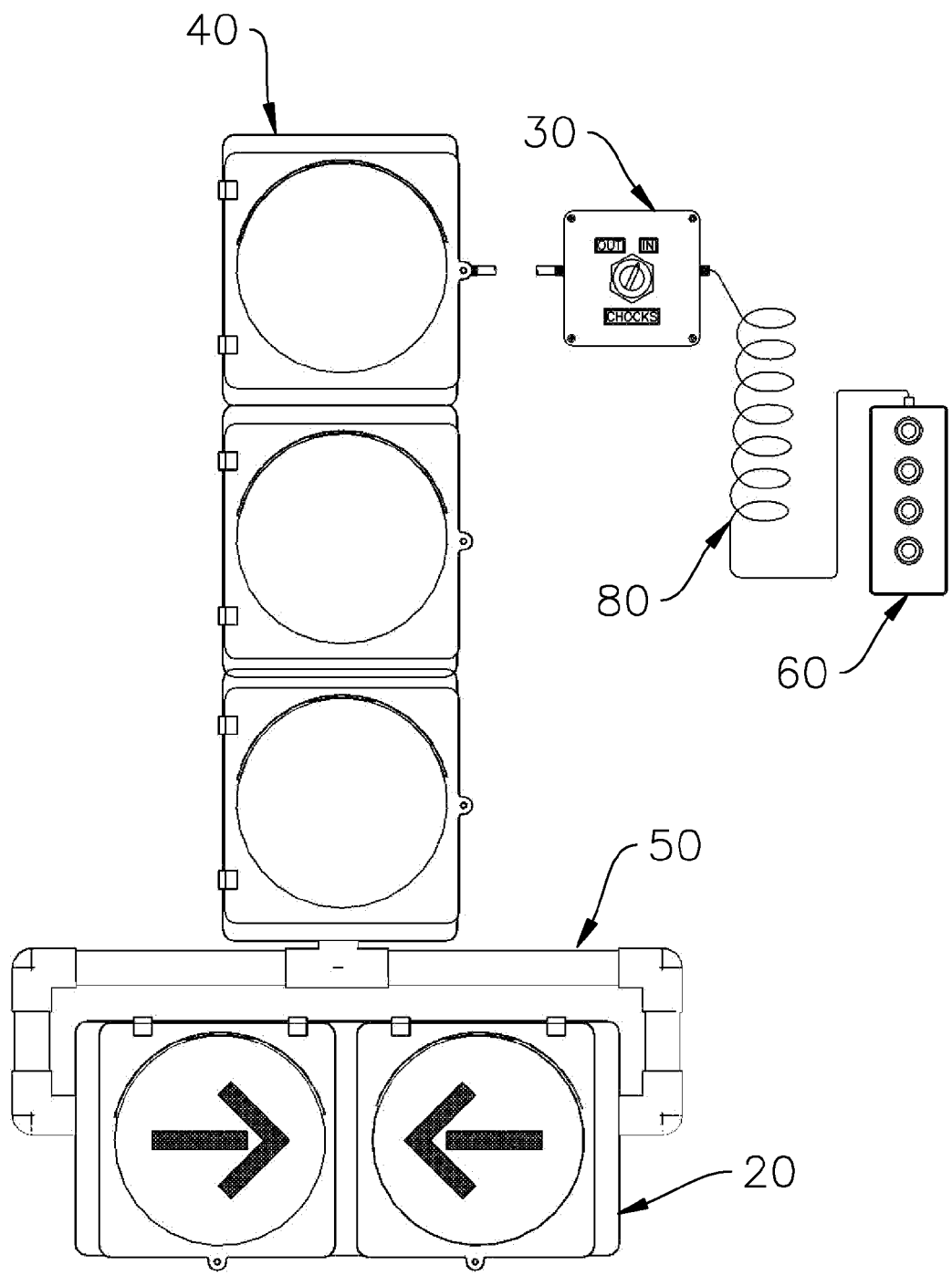
FIG. 10 is a front view of a typical traffic light assembly, Wheel Chocks Indicator assembly, remote selector switch, and a traffic light hand-held remote operator pendant.
Figure 10A:
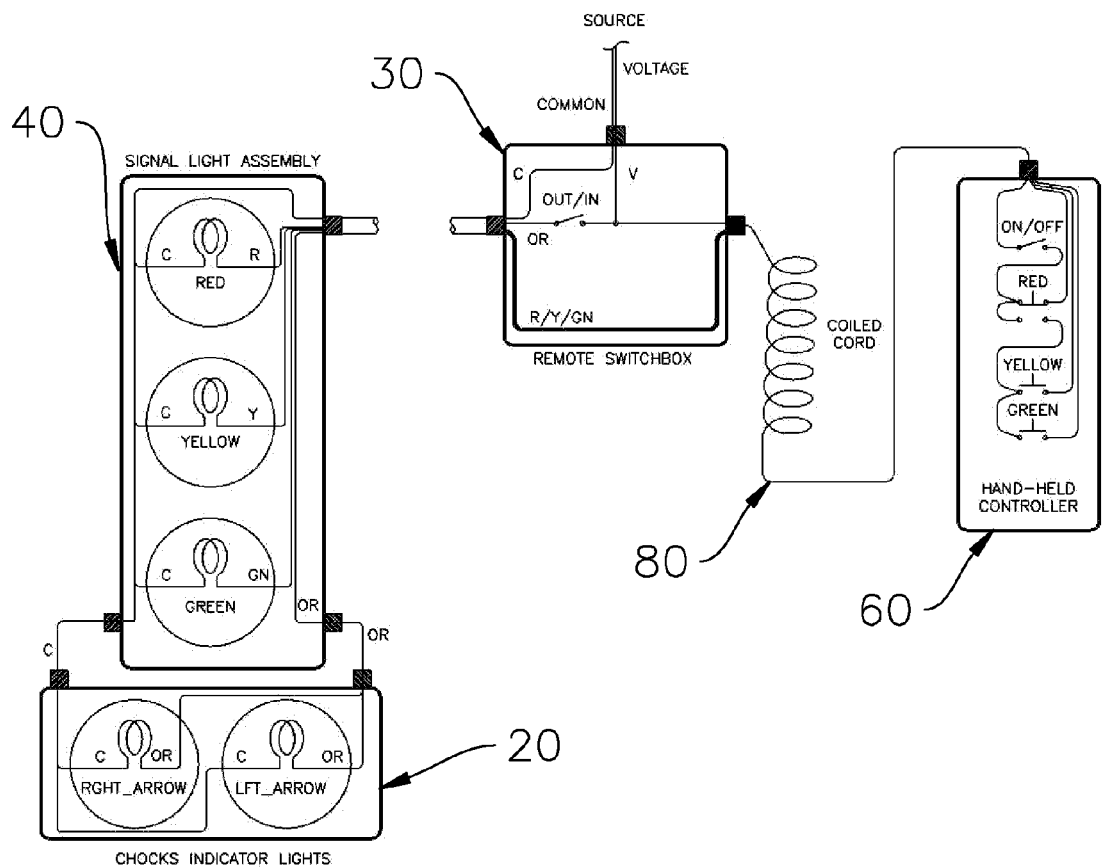
FIG. 10A is a wiring diagram depicting a method for combining the Wheel Chocks Indicator assembly with a traffic light and a typical traffic light hand-held remote operator pendant.

FIG. 10 depicts a Wheel Chocks Indicator system 20, 30, 50, when used in conjunction with a typical pendant control 60 for operating the traffic signal assembly 40. The pendant 60, coiled electrical cord 80, and traffic signal light 40 are not a part of the invention, but are shown here to depict how the two systems could be incorporated. FIG. 10A is a continuation of the concept depicting typical wiring. Note that the Wheel Cocks Indicator system wiring is unchanged from FIG. 4, with the exception that it is combined in common cabling and conduits with the traffic signal assembly.

Method of Use: When the aircraft has stopped at the gate and the wheel chocks have been inserted against the aircraft tires and the tarmac, the Ramp Agent would move the remote selector switch 32 in FIG. 3 from the "OUT" position 36*b* to the "IN" position 36*c*. This in turn would supply power to the indicator assembly 20 in FIG. 1 and illuminate the two arrows 21. The aircraft operator can view the indication from the aircraft cockpit windows and release the aircraft brakes. The Ramp Agent would extinguish the indicator by returning the selector switch 32 in FIG. 3 to the "OUT" position 36*b* prior to the next parking sequence. This provides the Ramp Agent a safe and effective signaling method that does not require hand signals or the use of elevating devices.

Figure 11:
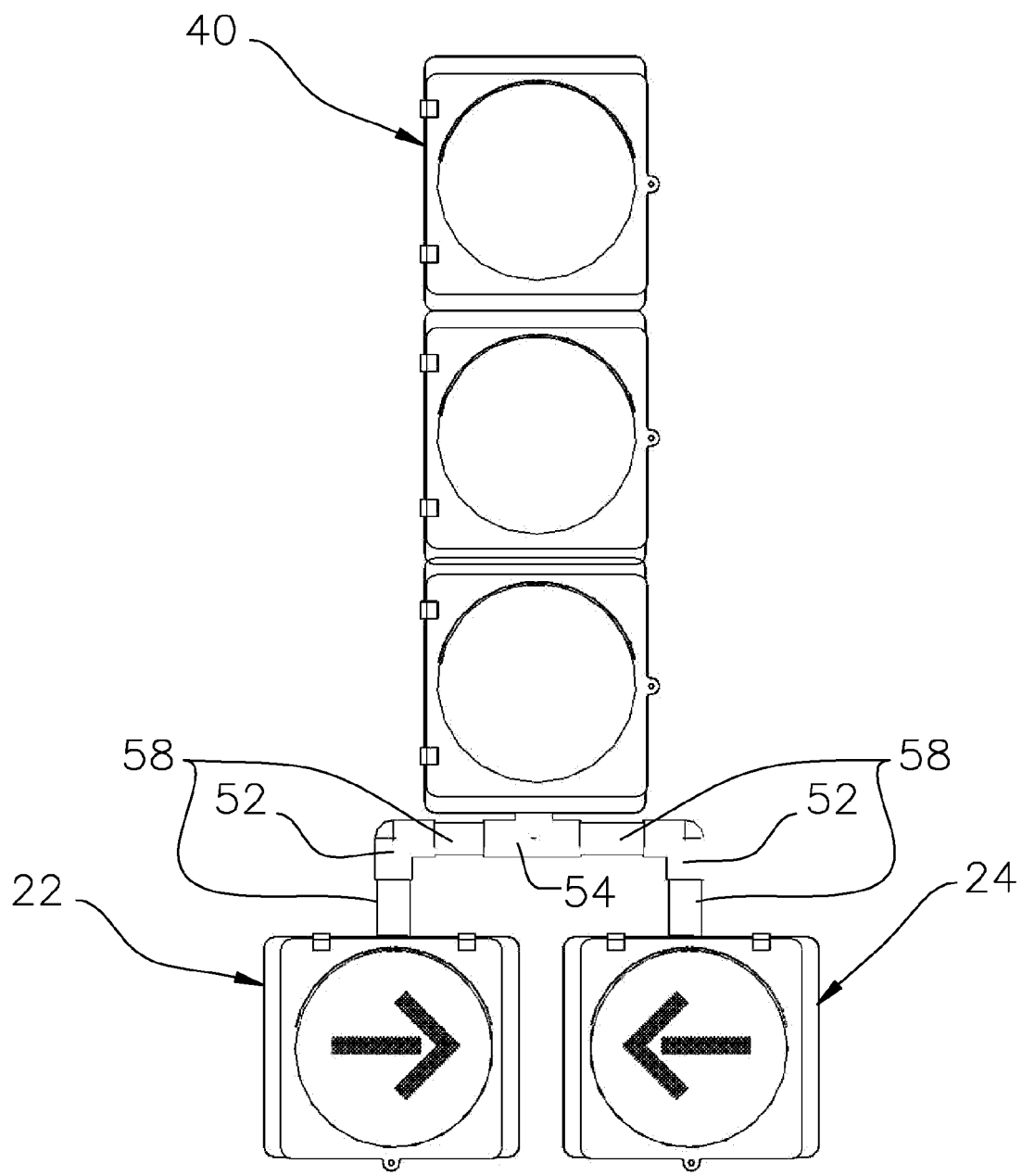
FIG. 11 is a front view of an alternate Wheel Chocks Indicator system with separated signal light modules.

Variations: FIG. 11 is a depiction of an alternate Wheel Chocks Indicator system with the two modules, 22 and 24 separated and attached to a traffic signal light 40. The support and piping system is similar to that used for the preferred embodiment of FIG. 7 with the exception that the plumbing enters from the top of the individual signal modules.

Figure 12:
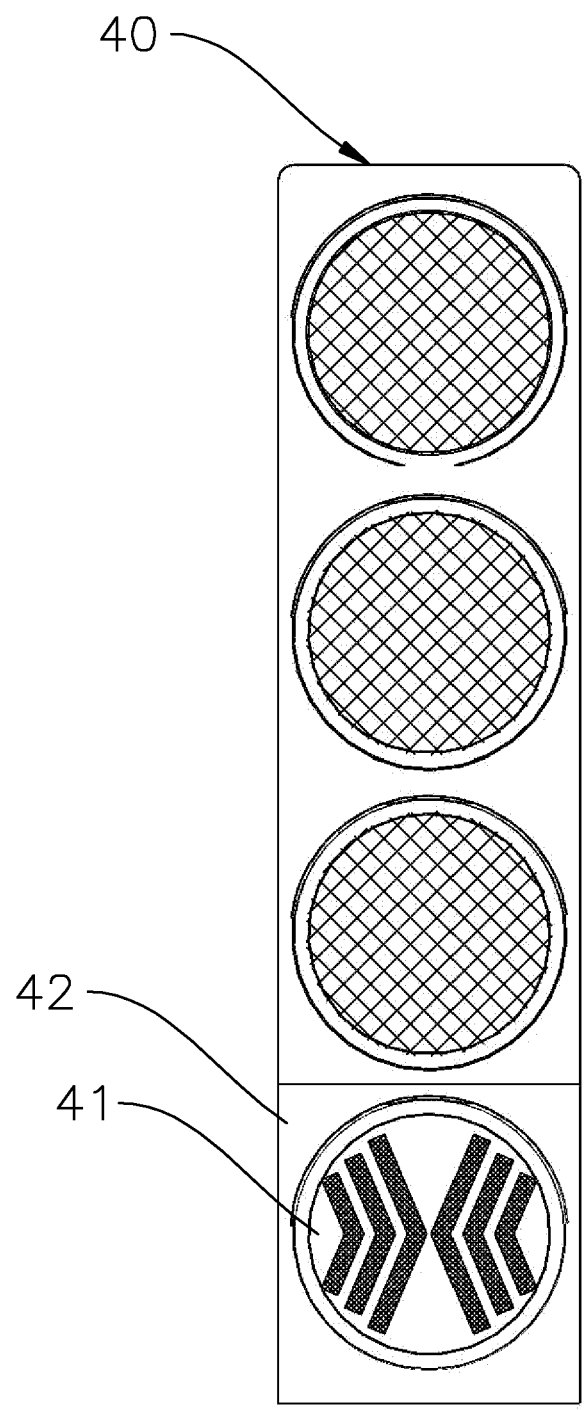
FIG. 12 is a front view of an alternate Wheel Chocks Indicator system that combines traffic signal modules with a Chocks Indicator module containing a plurality of chevron symbols.

FIG. 12 depicts an alternate Wheel Chocks Indicator system with a traffic signal assembly 40 affixed to an individual signal module 42. The individual module 42 contains a masked back-lighted lens or L.E.D. array with a plurality of chevron shaped characters 41. The chevrons are arranged in groups of one or more such that they form mirror image groups with the points of the closest chevrons in close proximity to each other (opposing each other). The module is wired in a manner similar to the preferred embodiment such that the illuminating component is switched from the remote switch assembly 30.

Figure 13:
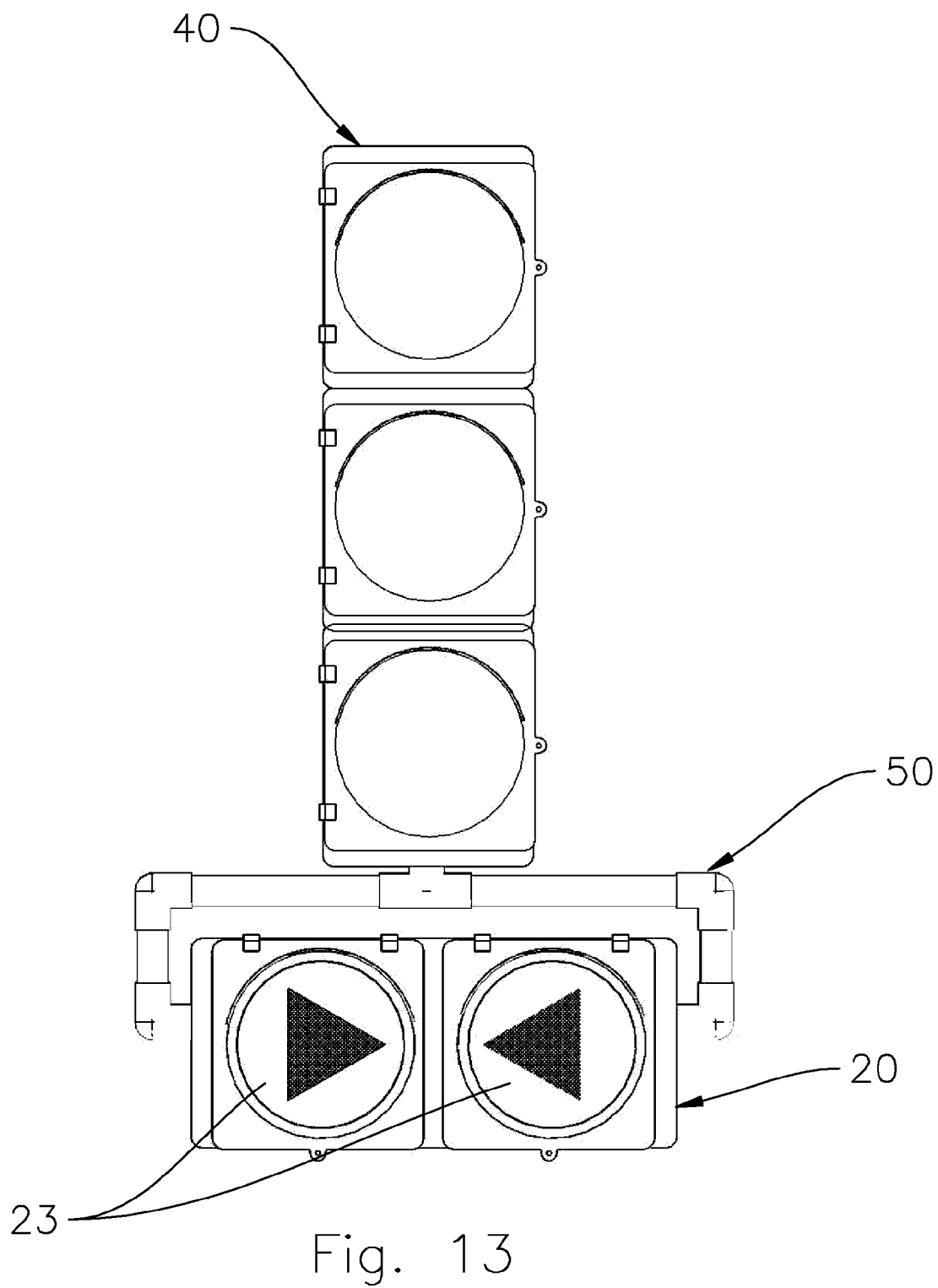
FIG. 13 is a front view of an alternate Wheel Chocks Indicator system that combines traffic signal modules with a Chocks Indicator module containing a plurality of triangular figures.

FIG. 13 depicts a Wheel Chocks Indicator system with an indicator light assembly 20 that contains masked back-lighted lenses or L.E.D. arrays configured in the shape of triangles 23. The indicator light assembly is wired in a manner similar to the preferred embodiment such that the illuminating component is switched from the remote switch assembly 30.

Figure 14:
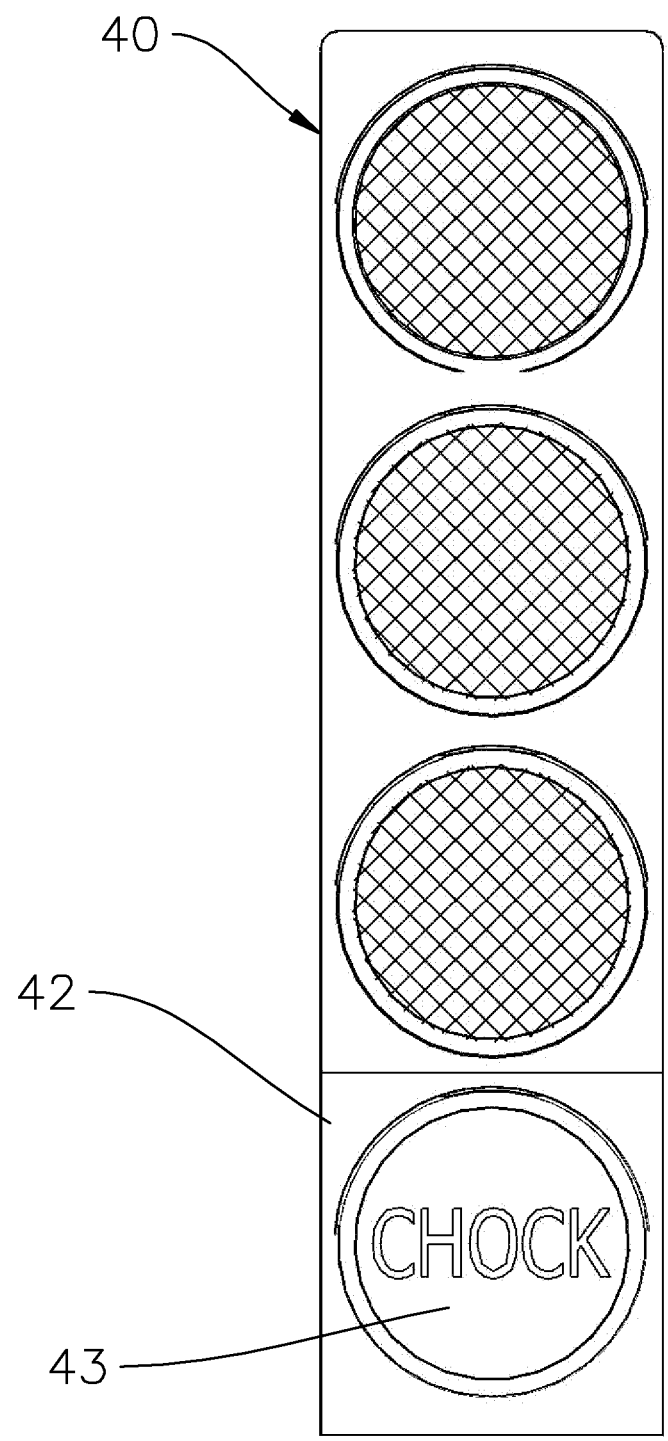
FIG. 14 is a front view of an alternate Wheel Chocks Indicator system that utilizes traffic signal modules with a Chocks Indicator module depicting the word "CHOCK".

FIG. 14 depicts an alternate Wheel Chocks Indicator system with a traffic signal assembly 40 affixed to an individual signal module 42. The individual module 42 contains a masked back-lighted lens or Light Emitting Diode array configured to display the word "CHOCK", 43. Acceptable configuration substitutions include the words "CHOCKS", "CHOCKED", "CHOCK IN", and "CHOCKS IN". The module is wired in a manner similar to the preferred embodiment such that the illuminating component is switched from the remote switch assembly 30.

The spirit of the present invention provides a breadth of scope that includes all methods of combining remotely activated illuminated characters that simulate the "Chocks-In" hand signal and installing the illuminated assembly in a location that is easily viewable by an aircraft operator when parked at a terminal. Any variation on the theme and methodology of accomplishing the same that are not described herein would be considered under the scope of the present invention.

The invention claimed is:

1. An illuminated display system for providing a visual indication visible to an aircraft operator in a cockpit of an aircraft that aircraft wheel chocks have been properly inserted against aircraft tires and tarmac at a terminal, comprising:
   a chocks indicator light assembly disposed at an elevation above the tarmac sufficient to be visible to the aircraft operator in the cockpit of the aircraft, said light assembly having at least one light module with a light emitting portion in a form of a word or symbol which, when illuminated, provides the visual indication that the aircraft wheel chocks have been properly inserted against the aircraft tires and the tarmac; and
   a control switch box disposed remote from said light assembly connected with an electrical power source and operatively connected with said light assembly via electrical cabling, including a manually operated switch to be operated by a person standing on the tarmac to supply electrical power to said light assembly for illuminating said at least one light module to indicate when the aircraft wheel chocks have been properly inserted against the aircraft tires and the tarmac.

2. The illuminated display system according to claim 1, wherein
   said control switch box contains a selector switch manually movable by the operator between a first position wherein said light emitting portion of said light module is not illuminated, and a second position to illuminate said light emitting portion to indicate that the chocks have been properly inserted against the aircraft tires and the tarmac.

3. The illuminated display system according to claim 1, wherein said at least one light module of said chocks indicator light assembly comprise a pair of laterally opposed light modules, each having the light emitting portion configured to display a symbol representing that the aircraft wheel chocks have been properly inserted against the aircraft tires and the tarmac.

4. The illuminated display system according to claim 3, wherein
   said symbol is an image with a pointed portion selected from the group consisting of an arrow, a triangle, and a chevron, with the pointed portion of the image of one light module facing the pointed portion of the image of the laterally opposed light module.

5. The illuminated display system according to claim 1, wherein
   said at least one light module of said chocks indicator light assembly comprises a single light module having a light emitting portion configured to display a symbol representing that the aircraft wheel chocks have been properly inserted against the aircraft tires and the tarmac.

6. The illuminated system according to claim 5, wherein said symbol is an image of a pair of laterally opposed chevrons having pointed portions facing in laterally opposed relation.

7. The illuminated display system according to claim 1, wherein
   said at least one light module of said chocks indicator light assembly comprises a light module having a light emitting portion configured to display a word or words representing that the aircraft wheel chocks have been properly inserted against the aircraft tires and the tarmac.

8. The illuminated display system according to claim 7, wherein
   said light emitting portion is configured to display a word or words selected from the group consisting of CHOCK, CHOCKS, CHOCKED, and CHOCKS IN.

9. The illuminated display system according to claim 1, wherein
   said at least one light module light emitting portion comprises a back-lighted lens masked to display a word or symbol when illuminated.

10. The illuminated display system according to claim 1, wherein
   said at least one light module light emitting portion comprises a series of light emitting diodes arranged to display a word or symbol when illuminated.

* * * * *